United States Patent
Bruls et al.

(10) Patent No.: US 10,015,465 B2
(45) Date of Patent: Jul. 3, 2018

(54) DEPTH MAP DELIVERY FORMATS FOR MULTI-VIEW AUTO-STEREOSCOPIC DISPLAYS

(71) Applicants: DOLBY INTERNATIONAL AB, Amsterdam (NL); KONINKLIJKE PHILIPS N.V., Eindhoven (NL)

(72) Inventors: Wilhelmus Henrikus Bruls, Eindhoven (NL); Klaas Heinrich Schueuer, Berlin (DE); Philipp Kraetzer, Berlin (DE)

(73) Assignees: Dolby International AB, Amsterdam (NL); Koninklijke Philips N.V., Eindhoven (NL)

(*) Notice: Subject to any disclaimer, the term of this patent is extended or adjusted under 35 U.S.C. 154(b) by 121 days.

(21) Appl. No.: 14/779,551

(22) PCT Filed: Apr. 4, 2014

(86) PCT No.: PCT/EP2014/056847
§ 371 (c)(1),
(2) Date: Sep. 23, 2015

(87) PCT Pub. No.: WO2014/161989
PCT Pub. Date: Oct. 9, 2014

(65) Prior Publication Data
US 2016/0050404 A1   Feb. 18, 2016

Related U.S. Application Data

(60) Provisional application No. 61/808,422, filed on Apr. 4, 2013.

(51) Int. Cl.
H04N 13/00       (2018.01)
H04N 19/597      (2014.01)
(Continued)

(52) U.S. Cl.
CPC ..... H04N 13/0011 (2013.01); H04N 13/0029 (2013.01); H04N 13/0048 (2013.01);
(Continued)

(58) Field of Classification Search
None
See application file for complete search history.

(56) References Cited

U.S. PATENT DOCUMENTS

8,780,998 B2    7/2014  Pandit
2004/0101043 A1  5/2004  Flack
(Continued)

FOREIGN PATENT DOCUMENTS

EP   1024672      8/2000
JP   2006-320002  11/2006
(Continued)

OTHER PUBLICATIONS

Li, J. et al "Asymmetric Coding Scheme for 3D Frame-Compatible Formats" IEEE Fourth International Workshop on Quality of Multimedia Experience, Jul. 5-7, 2012, pp. 154-155.
(Continued)

*Primary Examiner* — Sath V Perungavoor
*Assistant Examiner* — Xiaolan Xu

(57) ABSTRACT

Stereoscopic video data and corresponding depth map data for multi-view auto-stereoscopic displays are coded using a multiplexed asymmetric image frame that combines an image data partition and a depth map data partition, wherein the size of the image data partition is different than the size of the depth map data partition. The image data partition comprises one or more of the input views while the depth map partition comprises at least a portion of the depth map data rotated with respect to the orientation of the image data in the multiplexed output image frame.

18 Claims, 3 Drawing Sheets

(51) Int. Cl.
  *H04N 19/59* (2014.01)
  *H04N 19/46* (2014.01)
  *H04N 13/04* (2006.01)
  *H04N 19/85* (2014.01)

(52) U.S. Cl.
  CPC ..... *H04N 13/0402* (2013.01); *H04N 13/0445* (2013.01); *H04N 19/46* (2014.11); *H04N 19/59* (2014.11); *H04N 19/597* (2014.11); *H04N 19/85* (2014.11); *H04N 2013/0081* (2013.01); *H04N 2213/003* (2013.01); *H04N 2213/005* (2013.01)

(56) References Cited

U.S. PATENT DOCUMENTS

| | | |
|---|---|---|
| 2011/0280311 A1 | 11/2011 | Chen |
| 2013/0135435 A1* | 5/2013 | D'Amato et al. . H04N 13/0022 348/43 |

FOREIGN PATENT DOCUMENTS

| | | |
|---|---|---|
| TW | 201223248 | 6/2012 |
| WO | 98/39927 | 9/1998 |
| WO | 2012/014171 | 2/2012 |
| WO | 2012/063213 | 5/2012 |
| WO | 2012/067399 | 5/2012 |
| WO | 2014/025294 | 2/2014 |

OTHER PUBLICATIONS

Vetro, A. "Frame Compatible Formats for 3D Video Distribution" IEEE International Conference on Image Processing, Sep. 26-29, 2010, pp. 2405-2408.

* cited by examiner

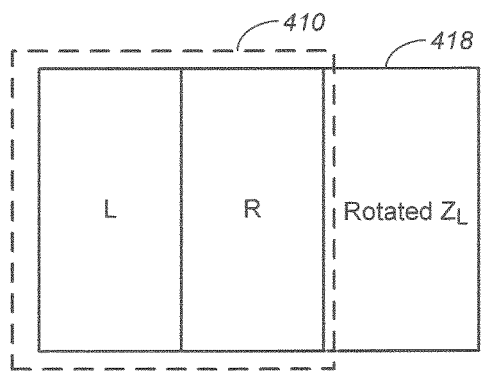
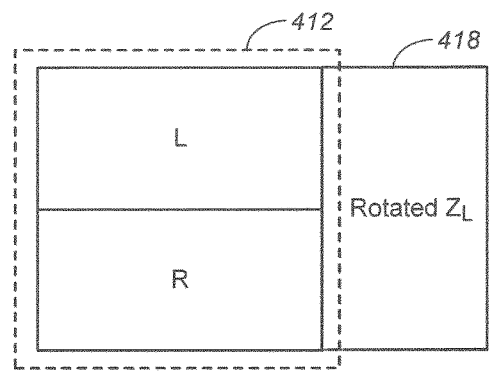
FIG. 4A  FIG. 4B
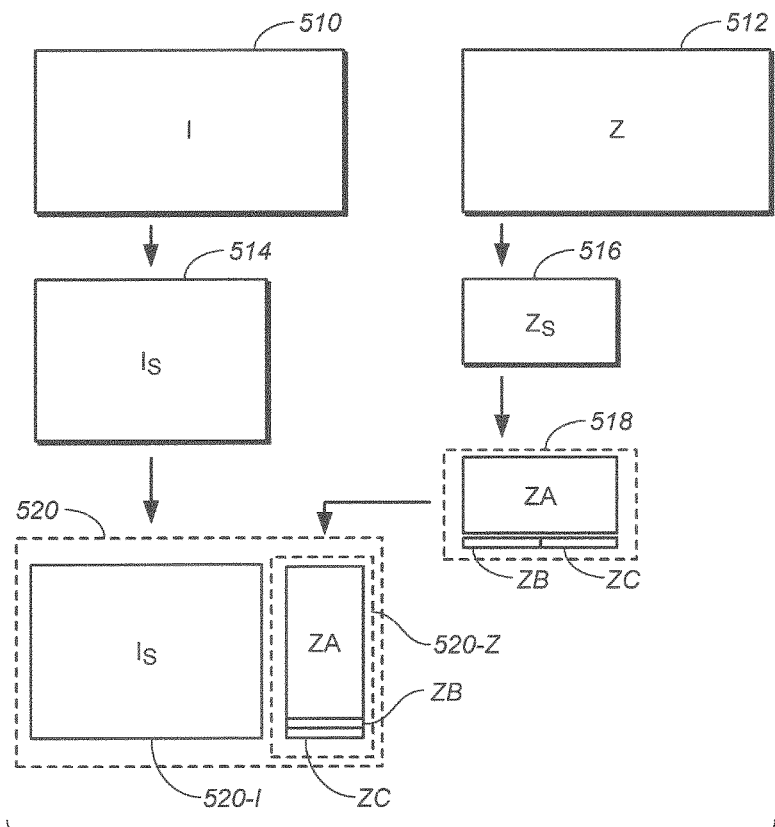
FIG. 5

DEPTH MAP DELIVERY FORMATS FOR MULTI-VIEW AUTO-STEREOSCOPIC DISPLAYS

CROSS-REFERENCE TO RELATED APPLICATIONS

This application claims priority to U.S. Provisional Application No. 61/808,422 filed 4 Apr. 2013, which is hereby incorporated by reference in its entirety.

TECHNOLOGY

The present invention relates generally to images. More particularly, an embodiment of the present invention relates to formats for the delivery of depth maps for multi-view auto-stereoscopic displays.

BACKGROUND

Three dimensional (3D) video systems garner great interest for enhancing a consumer's experience, whether at the cinema or in the home. These systems use stereoscopic or auto-stereoscopic methods of presentation, including: anaglyph, linear polarization, circular polarization, shutter glasses, and spectral separation.

Most of the 3D displays available in the market today are stereoscopic televisions (TVs), requiring the user to wear shutter 3D glasses in order to experience a 3D effect. Delivery of 3D content to these displays requires carrying two separate views: a left view and a right view. Wide adoption of auto-stereoscopic (glasses-free) displays is in the horizon. These displays provide some amount of motion parallax; the viewer can slightly move his/her head around to view objects from vastly different angles.

Traditional stereoscopic displays provide a single 3D view; however, auto-stereoscopic displays (also called multi-view displays) provide multiple views such as five views, nine views, 28 views, etc., based on the design of the display. When conventional stereoscopic content is provided to auto-stereoscopic displays, the displays extract depth maps and create or render multiple views based on this depth map. As used herein, the term "depth map" denotes an image or other bit-stream that contains information related to the distance of the surfaces of scene objects from a viewpoint. As more fully explained below, a depth map can be readily converted to a disparity map, and in the context of this document the terms depth map and disparity map are the same and inter-changeable.

The depth map information also may be used for tailoring the 3D experience for different displays types with different resolutions and display size (e.g., 1080p displays or 4K displays). There have been a number of studies showing the amount of depth designed for 3D cinema is not suitable for smaller mobile devices and vice-versa. The depth map could be used to re-render the views to alter the perceived depth and to make additional adjustments. As appreciated by the inventors here, improved techniques for delivering depth maps along with the content are desirable for improving the user experience with auto-stereoscopic and stereoscopic displays. It is further appreciated that these improved techniques preferably are backwards compatible with existing single-view (2D) and 3D systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4A and FIG. 4B depict examples of depth map delivery formats according to embodiments of the present invention; and FIG. 5 depicts an example process for generating image data and depth map data partitions using both depth map rotation and depth map segmentation according to an embodiment of the present invention.

DESCRIPTION OF EXAMPLE EMBODIMENTS

Delivery formats for depth maps for stereoscopic and auto-stereoscopic (multi-view) displays are described herein. The formats support a variety of video delivery scenarios, including traditional cable, satellite, or over the air broadcasting and over-the-top delivery. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to delivery formats for depth map information for multi-view displays. Given a 3D input picture and corresponding input depth map data, a multiplexed, asymmetric, output image frame may be created that combines an image data partition and a depth map data partition, wherein the image data partition has a different size than the depth map data partition. The image data partition comprises one or more of the input views of the 3D input while the depth map partition comprises at least a portion of the input depth map data rotated with respect to the orientation of the image data in the multiplexed output image frame.

In some embodiments, depth map data may also be segmented into one or more depth map segments which may be rearranged before being multiplexed into the depth map partition of the output image frame.

Example Delivery Formats for 3D

Figure 1:
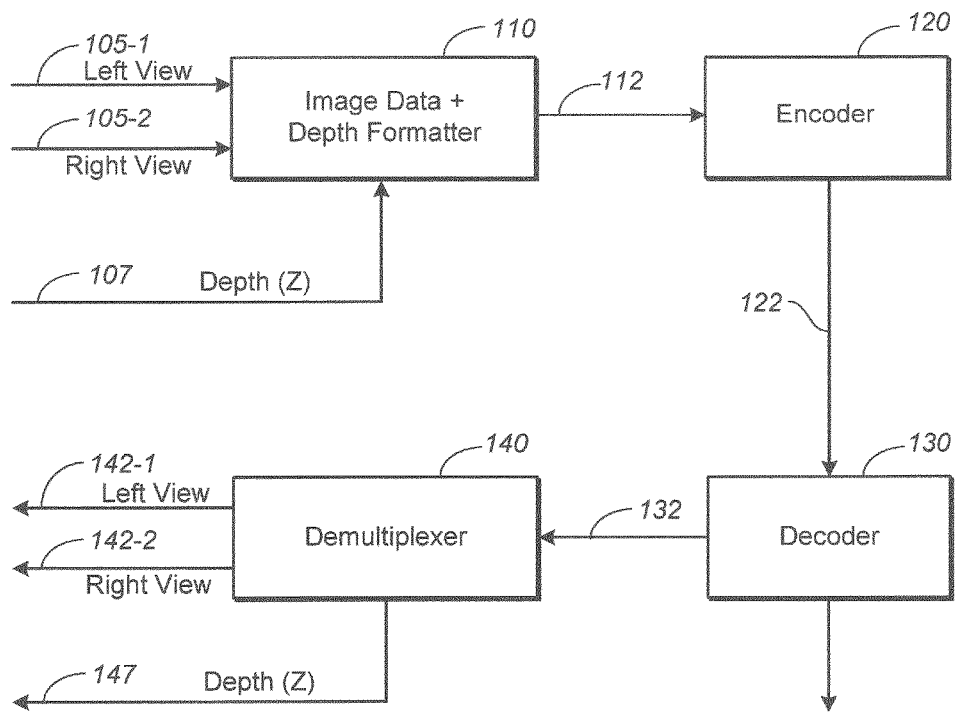
FIG. 1 depicts an example system for delivering 3D video and associated depth data according to an embodiment of the present invention.

FIG. 1 depicts an example system for encoding and decoding 3D data and associated depth data according to an embodiment of the present invention. As depicted in FIG. 1, left and right views (105-1, 105-2) of an input stereoscopic signal (105) and associated depth data Z (107) are first formatted and multiplexed by Image Data and Depth Formatter (110) into a 3D+Z signal (112) according to methods to be described herein.

In an embodiment of the present invention, depth data (107) represent disparities between the left and right views. As used herein, the term 'disparity' denotes the difference in lateral distance between the location of an object in a left view and a right view of a stereoscopic image. In stereo video imaging, disparity typically represents the horizontal shift (e.g., to the left or to the right) of an image feature in one view (e.g., the left image) when viewed in the other view (e.g., the right image). For example, a point located in the horizontal positions $h_L$ in the left image and $h_R$ in the right image may be denoted as having a disparity of $h_L$-$h_R$ pixels. Disparity data may also be represented as depth or "input Z" data, typically represented as 8-bit grayscale data in the [0, 255] range, although alternative representations can be used.

Depending on the coding format, the 3D+Z signal (112) may comprise one or more layers, such as a base layer, and one or more enhancement layers. The 3D+Z signal (112) is encoded by Encoder (120) to generate a coded bit-stream (122). Encoder (120) may be any of the known video encoders, such as those specified by the ISO/IEC MPEG-2, MPEG-4 part 2, MPEG-4, part 10 (H.264/AVC), or HEVC standards, or other encoders, such as VP8, VC-1, and the like. Before storage or transmission, the coded bitstream (122) may be multiplexed with additional ancillary data or metadata (not shown) to assist suitable decoders to decode and demultiplex the stereoscopic image data and their corresponding depth data.

In a receiver, such as a set-top box, a TV, and the like, Decoder (130) (e.g., an MPEG-2 or H.264 decoder) can decode bitstreams encoded by the Encoder (120) and generates a decoded 3D+Z signal, which, for lossy compression, is a close approximation of the transmitted 3D+Z signal (112). Demultiplexor (140) extracts the depth map data (147) and one or more image views (142), and may pass them to subsequent processing, such as related to display management and display. Legacy receivers may ignore the depth data and the second view, thus displaying only a single view as a traditional 2D image; however, other decoders can regenerate one or more views of 3D signal (105) using all information available.

Figure 2:
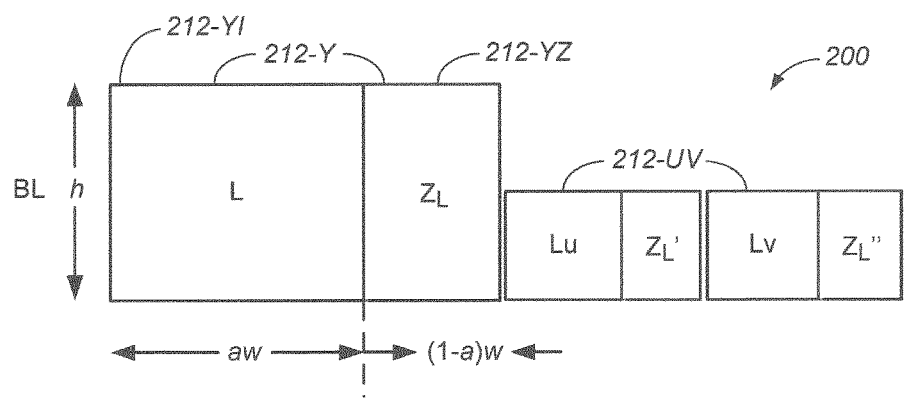
FIG. 2 depicts an example of an asymmetric single layer depth map delivery format.

FIG. 2 depicts an example of a single layer 3D+Z signal delivery format (200). Formatted 3D+Z signal (212) comprises a luminance or luma component (212-Y) and corresponding chroma components (212-UV). For example, in some embodiments, signal (212) may be encoded in a 4:2:0 YUV format. In some other embodiments it may be encoded in a 4:2:0 YCbCr format. As depicted in FIG. 2, chroma components of signal (212) may have a lower pixel resolution than the luma components; however, all methods described herein apply to color formats where chroma may be at the same resolution as the luma component (e.g., 4:4:4 YCbCr or 4:4:4 YUV).

Delivery format (200) may use asymmetric spatial multiplexing; that is, in a multiplexed picture that combines both image data (212-YI) (e.g., left view (L) 105-1) and associated depth data (212-YZ) (e.g., Z 107), a resolution of image data (e.g., the left view (L)) differs from a resolution of its associated depth map (e.g., $Z_L$).

Given a multiplexed input frame (e.g., 112) with a pixel resolution h×w (e.g., h=1080 and w=1920), in an embodiment, the sub-sampled left view (L) may be allocated more pixels than its associated depth map. Thus, given a scale a, where 1>a≥½, the original left view picture may be scaled (e.g., sub-sampled) to a size h×aw, while the depth map may be scaled to a size h×(1−a) w. This approach may result in sharper 3D pictures than symmetric left and right view pictures (e.g., when a=½).

Optionally, additional depth data (e.g., $Z_{L'}$ and $Z_{L''}$) may also be embedded in the corresponding chroma components of the coded frame (e.g., 212-UV).

In an alternative embodiment, the size of the picture frame containing the image and depth map partitions (e.g., 212-Y) may be larger than the active image size of a view of the input image; hence, there might not be any need to scale the image data to fit within the image partition. For example, given 1080×1920 image data (e.g., L), width w of (212-Y) may be larger than 1920 and height h may be larger than 1080. The delivery frame may also be padded by dummy data in order to achieve alignment with the size of the coded units (e.g., macroblocks) used by Encoder (120). For example, in an example embodiment, 8 pixel lines may be added to a high of 1080, so that the total number of lines, 1088, is a multiple of 16.

In an alternative embodiment, the multiplexed image frame (e.g. 112) may be partitioned across the vertical direction. Hence an image data partition (212-YI) may have an ha×w resolution while the depth map data partition (212-YZ) may have an h(1−a)×w resolution.

In some embodiments the image data partition may be multiplexed to the right of the depth map data partition.

In some embodiments the image data partition may be multiplexed to the bottom of the depth map data partition.

In an embodiment, backward compatibility may be achieved by defining the active area of the picture (e.g., h×aw) by using a cropping rectangle and aspect ratio syntax parameters in the encoding bitstream, similar to those defined in AVC/H.264 or the HEVC video coding standard. Under such an implementation, a legacy 2D receiver may extract, decode, and display only the picture area (e.g., L) defined by these parameters and ignore the depth map information (e.g., $Z_L$). Receivers with 3D capability may decode the whole picture, determine the picture areas and depth-map areas using the cropping parameters, and then use the depth map information to render multiple views. The 3D receiver can scale the 2D picture and depth as needed using the received cropping and aspect ratio parameters. Auxiliary data (or metadata) that contain information about the picture arrangements on a per picture basis may also be transmitted.

In an example embodiment, if a=⅔, given a 1080×1920 input signal, then the image data (e.g., L) may be downscaled in the horizontal dimension and coded using a resolution of 1080×1280 pixels, while the depth component (e.g., $Z_L$) may be scaled and coded using a 1080×640 resolution. In some embodiments, the depth component may be downscaled in both the horizontal and vertical resolutions and coded in alternative resolutions, smaller than the available area in the depth map partition, e.g., 540×640 or 360×640. In such implementations, pixel values of luminance or chroma components that do not correspond to any depth values may be set to a fixed filler value (e.g., 128) to improve coding efficiency. The performance of this asymmetric format may be further improved by allowing for a more balanced allocation of image and depth data, as depicted in FIG. 3.

Figure 3:
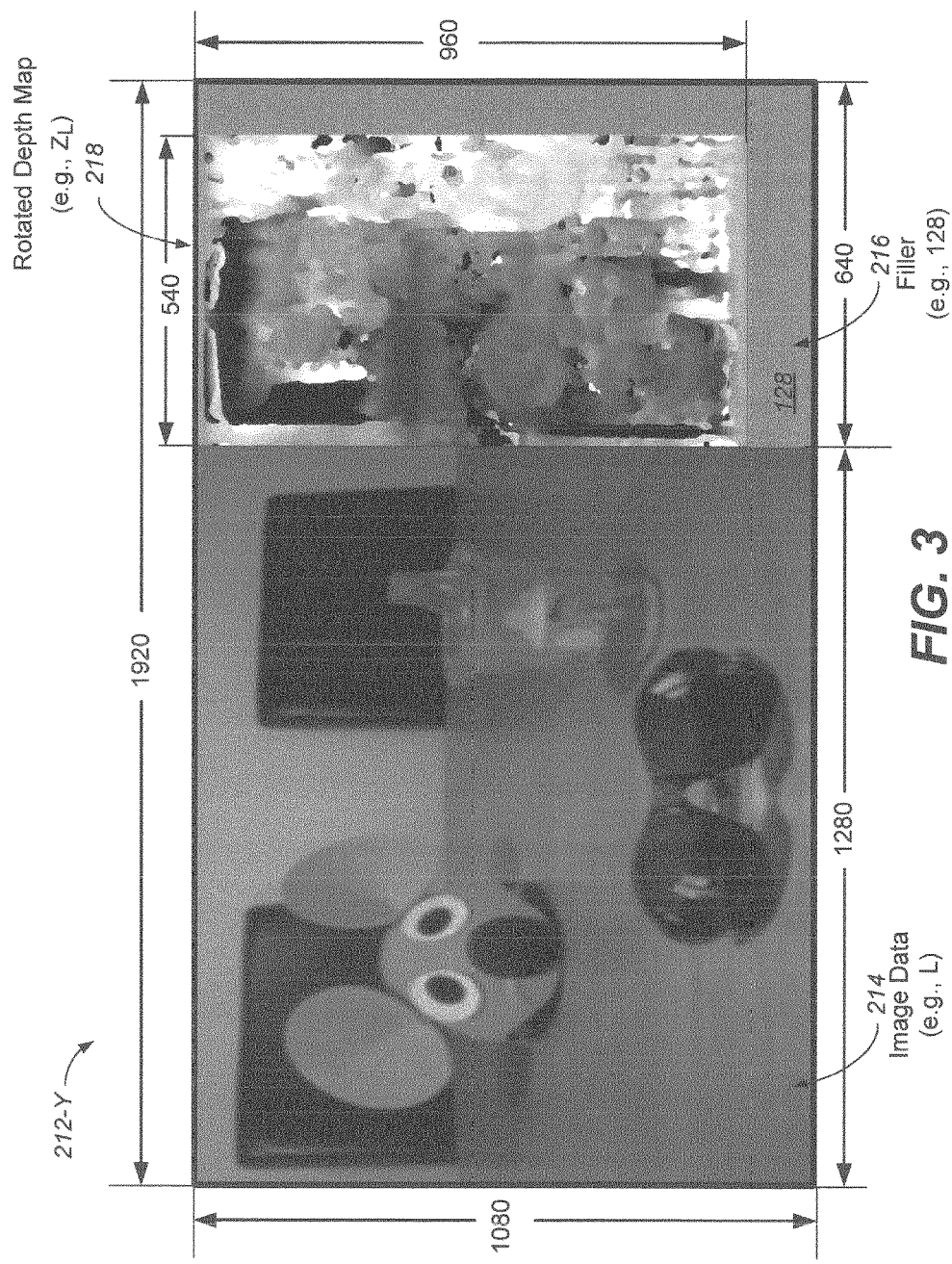
FIG. 3 depicts an example of an asymmetric depth map delivery format using a rotated depth map according to an embodiment of the present invention.

FIG. 3 depicts an example of depth map delivery format according to an embodiment of the present invention. For simplicity, only the luma component of signal (112) is depicted; however, similar pixel allocation may be performed on the chroma components as well. As depicted in FIG. 3, image (212-Y) comprises a scaled representation of the luma component of one or more of the image views (e.g., L 214) and a rotated and scaled representation of a depth map of interest (e.g., $Z_L$ 218). As an example, for a 1080×1920 input, in one embodiment, the luminance of the image view may be scaled into a 1080×1280 resolution (corresponding to ⅔ scaling in the horizontal direction), while the original depth map may be scaled into a 540×960 resolution (corresponding to scaling by half in both the horizontal and vertical directions). A rotation of the depth map by 90 degrees, as depicted in FIG. 3, allows transmitting depth maps of higher horizontal resolution than the traditional format depicted in FIG. 2, which results in overall better and more accurate 3D picture quality at a receiver.

As depicted in FIG. 3, due to scaling and rotation, some of the pixel area of the image frame (212-Y) may be unused. This area (e.g., 216) may be either set to a fixed filler value (e.g., 128) or the image and depth data regions may be scaled appropriately so that their sum fills the whole area. For example, in an embodiment, the image area may have a 1080×1380 pixel resolution while the depth map data area may have a 540×960 pixel resolution. In a preferred embodiment, for improved coding efficiency, the dimensions of the image and depth map view sizes may be selected to be multiples of the coding unit sizes used by Encoder (120) (e.g., 16×16 pixels). Alternatively, the frame sizes of the delivery format (e.g., 212-Y) may be adjusted by adding dummy data in order to achieve alignment with the size of the coded unit used by the Encoder (120) (e.g., a macroblock). For example, in an example embodiment, 8 pixel lines may be added to a high of 1080, so that the total number of lines, 1088, is a multiple of 16.

As depicted in example embodiments in FIGS. 4A and 4B, rotated depth maps can be used in a variety of other depth data delivery formats. The format depicted in FIG. 4A is similar to the one depicted in FIG. 3, except that the image part (410) comprises both left (L) and right views (R) subsampled in the horizontal direction and stacked side by side. In an example embodiment, using a 1080×1920 frame, each of the views may be stored using a 1080×720 resolution, while a 480×960 depth map (e.g., $Z_L$) is stored rotated in a 1080×480 depth map data partition (418).

As depicted in FIG. 4B, in another embodiment, the image part (412) comprises both the left (L) and right views (R) subsampled in both the vertical and horizontal directions and stacked one on top of the other. In an example embodiment, using a 1080×1920 frame, each of the views may be stored using a 540×1440 resolution while a 480×960 depth map (e.g., $Z_L$) is stored rotated in a 1080×480 depth map data partition (418).

In FIG. 5, depth data delivery format (520) depicts another example of a 3D+Z data delivery according to an embodiment. This format combines the rotation of depth map data with optional segmentation. As an example, consider original image data (I) (510) and depth data (Z) (512), at a 1080×1920 resolution, to be multiplexed into a single 1080×1920 output frame (520). As before, for simplicity, only the multiplexing for the luminance component is depicted; however, analogous operations may be performed on the chroma component as well.

Using the principles of asymmetric spatial scaling, both the image data and the depth data may be scaled to generate scaled image data $I_S$ (514) and scaled depth map data $Z_S$ (516). For example, image I may be scaled by ¾ across the horizontal direction to generate a 1080×1440 image $I_S$ (514), while depth data Z (512) may be scaled by a factor of two in both directions to generate a 540×960 scaled depth map $Z_S$ (516). To fit $Z_S$ into the depth map partition (520-Z), (e.g. 1080×(1920−1440)=1080×480), scaled depth map $Z_S$ (516) may be divided in two or more segments (e.g., 480×960 ZA, and 60×480 ZB and ZC). Then, the depth map partition (520-Z) of the output multiplexed image (520) may comprise: a rotated ZA depth map segment stacked on top of the ZB and ZC depth map segments.

The scaling of the depth data Z (512) may take into consideration the size of the allocated depth map partition (520-Z) and any subsequent rotation and segmentation of the depth map segments.

In some embodiments, the size of the image part partition (520-I) of the output multiplexed picture (520) may be equal or larger than the size of the active input image data I (510), hence the scaling of image data (510) may be skipped.

In some embodiments, the image data partition and the depth data partition may be multiplexed by stacking them vertically, one on top of the other.

The location, size, and orientation of the depth map segments in output image (520) may be signaled from an encoder to a decoder using ancillary data or metadata. In a receiver, after decoding and demultiplexing the image data and depth data regions, the receiver may use the metadata to demultiplex the depth data segments (518) and reconstruct a unified depth map region (516), which may be scaled as needed to view the image data (510).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to encoding and decoding depth map delivery formats, such as those described herein. The computer and/or IC may compute any of a variety of parameters or values that relate to encoding and decoding depth map delivery formats as described herein. The image and video dynamic range extension embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods for encoding and decoding depth map delivery formats as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of non-transitory forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including equivalents of that component and any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to encoding and decoding depth map delivery formats are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of recited Claims that issue from this application, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for delivering 3D depth data, the method comprising:
    accessing an input stereoscopic picture and input depth data;
    generating an image data partition in a first orientation in response to the input stereoscopic picture, the image data partition having a first pixel resolution in a first direction;
    generating a depth map data partition, wherein the depth map data partition has, in a second direction perpendicular to the first direction, a second pixel resolution equal to the first pixel resolution;
    multiplexing the image data partition and the depth map partition to form a multiplexed output picture, wherein the depth map partition comprises a depth map segment rotated with respect to the first orientation; and
    encoding, using an encoder, the multiplexed output picture to generate a coded bitstream.

2. The method of claim 1, wherein the image data partition comprises pixel data based on either a first view of the input stereoscopic picture or a second view of the input stereoscopic picture.

3. The method of claim 1, wherein the image data partition comprises pixel data based on both a first view of the input stereoscopic picture and a second view of the input stereoscopic picture.

4. The method of claim 2, wherein the image data partition is generated by down-sampling the first view or the second view of the input stereoscopic picture across a horizontal direction or a vertical direction.

5. The method of claim 2, wherein the image data partition is generated by down-sampling the first view or the second view of the input stereoscopic picture across both a vertical direction and a horizontal direction.

6. The method of claim 3, wherein the image data partition is generated by down-sampling at least one of the image views across a horizontal direction or a vertical direction.

7. The method of claim 3, wherein the image data partition is generated by down-sampling at least one of the image views across both a horizontal direction and a vertical direction.

8. The method of claim 1, wherein the first orientation is a horizontal orientation.

9. The method of claim 1, wherein the at least one depth map segment is rotated by 90 degrees.

10. The method of claim 1, wherein the image data partition and the depth map data partition are multiplexed as side by side pictures.

11. The method of claim 1, wherein the image data partition and the depth map data partition are multiplexed as top and bottom pictures.

12. The method of claim 3, wherein generating the image data partition further comprises:
    downsampling the first view to create a downsampled first view;
    downsampling the second view to create a downsampled second view; and
    generating the image data partition by multiplexing the downsampled first view and the downsampled second view by stacking them either in a side by side format or a top-bottom format.

13. The method of claim 1, wherein generating the depth map data partition comprises:
    downscaling the input depth data to generate a scaled depth map;
    segmenting the scaled depth map to generate two or more depth map segments;
    rotating at least one of the depth map segments to generate a rotated depth map segment; and
    multiplexing the rotated depth map segment and one or more of the remaining depth map segments to form the depth map data partition.

14. The method of claim 13, wherein the scaled depth picture is segmented across a horizontal direction or a vertical direction.

15. The method of claim 13, wherein multiplexing the rotated depth map segment and one or more of the remaining depth map segments to form the depth map data partition comprises stacking the rotated depth map segment and another depth map segment vertically or horizontally.

16. An apparatus comprising a processor and configured to perform the method recited in claim 1.

17. A non-transitory computer-readable storage medium having stored thereon computer-executable instructions for executing a method in accordance with claim 1.

18. The method of claim 1, the image data partition including pixel data based on at most one of (i) a first view of the input stereoscopic picture and (ii) a second view of the input stereoscopic picture.

* * * * *